(12) United States Patent
Merget et al.

(10) Patent No.: US 9,387,417 B2
(45) Date of Patent: *Jul. 12, 2016

(54) ANTIFOAMING AGENTS AND USE THEREOF IN DETERGENTS

(71) Applicant: Wacker Chemie AG, Munich (DE)

(72) Inventors: Markus Merget, Mehring (DE); Richard Becker, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/409,294

(22) PCT Filed: Jun. 13, 2013

(86) PCT No.: PCT/EP2013/062252
§ 371 (c)(1),
(2) Date: Dec. 18, 2014

(87) PCT Pub. No.: WO2013/189825
PCT Pub. Date: Dec. 27, 2013

(65) Prior Publication Data
US 2015/0165345 A1 Jun. 18, 2015

(30) Foreign Application Priority Data
Jun. 18, 2012 (DE) .......................... 10 2012 210 211

(51) Int. Cl.
| | | |
|---|---|---|
| C11D 3/02 | (2006.01) | |
| B01D 19/04 | (2006.01) | |
| C11D 3/00 | (2006.01) | |
| C11D 3/04 | (2006.01) | |
| C11D 3/08 | (2006.01) | |
| C11D 3/10 | (2006.01) | |
| C11D 3/12 | (2006.01) | |
| C11D 3/37 | (2006.01) | |
| C11D 7/10 | (2006.01) | |
| C11D 7/12 | (2006.01) | |
| C11D 7/14 | (2006.01) | |

(52) U.S. Cl.
CPC ........ *B01D 19/0413* (2013.01); *B01D 19/0404* (2013.01); *B01D 19/0409* (2013.01); *C11D 3/0026* (2013.01); *C11D 3/046* (2013.01); *C11D 3/08* (2013.01); *C11D 3/10* (2013.01); *C11D 3/128* (2013.01); *C11D 3/3742* (2013.01); *C11D 7/10* (2013.01); *C11D 7/12* (2013.01); *C11D 7/14* (2013.01)

(58) Field of Classification Search
CPC ................................ C11D 3/02; C11D 3/3742
See application file for complete search history.

(56) References Cited

U.S. PATENT DOCUMENTS

| | | | |
|---|---|---|---|
| 4,637,890 A | 1/1987 | Crabtree et al. | |
| 4,894,117 A | 1/1990 | Bianchi et al. | |
| 6,326,061 B1 | 12/2001 | Lautenschlager et al. | |
| 8,481,476 B2 * | 7/2013 | Paul .................. | B01D 19/0409 510/276 |

FOREIGN PATENT DOCUMENTS

| | | | |
|---|---|---|---|
| DE | 19739991 A1 | 3/1999 | |
| EP | 0254499 B1 | 1/1988 | |
| EP | 0685250 A1 | 12/1995 | |
| EP | 0692567 A1 | 1/1996 | |
| WO | 2011107361 A2 | 9/2011 | |
| WO | 2011107397 A1 | 9/2011 | |
| WO | WO 2011/107361 * | 9/2011 | ............. B01D 19/04 |
| WO | 2012/075962 A1 | 6/2012 | |

OTHER PUBLICATIONS

R. Watson, "Laundry Detergent Formulations," Handbook of Detergents, Part D, Chapter 3, pp. 9.

* cited by examiner

*Primary Examiner* — Brian P Mruk
(74) *Attorney, Agent, or Firm* — Brooks Kushman P.C.

(57) ABSTRACT

Antifoam powders with delayed anti-foaming action, contain
(1) 5 to 35% by weight of an anti-foaming agent which is an amino-functional organopolysiloxane and consists of at least one siloxane unit of the formula $$R^1_a Q_b SiO_{\frac{4-(a+b)}{2}} \quad (I)$$

and siloxane units of the general formula $$R^1_c SiO_{\frac{4-c}{2}} \quad (II)$$

where
Q is an amino group of the general formula $$-R^2-[NR^3-(CH_2)_m-]_x NR^4 R^5 \quad (III)$$

or forms thereof with partial or full protonation on the nitrogen atoms,
(2) 65 to 95% by weight of a carrier material selected from the group of sodium carbonate, sodium sulphate, aluminium silicate, potassium carbonate, potassium sulphate, sodium hydrogencarbonate, potassium hydrogencarbonate, zeolites, and mixtures thereof.

14 Claims, No Drawings

ANTIFOAMING AGENTS AND USE THEREOF IN DETERGENTS

CROSS REFERENCE TO RELATED APPLICATIONS

This application is the U.S. National Phase of PCT Appln. No. PCT/EP2013/062252 filed Jun. 13, 2013, which claims priority to German Application No. 10 2012 210 211.6 filed Jun. 18, 2012, the disclosures of which are incorporated in their entirety by reference herein.

BACKGROUND OF THE INVENTION

1. Field of the Invention

The invention relates to anti-foaming agents and to the use thereof in detergent compositions.

2. Description of the Related Art

Handwashing involves introducing water into a bucket or soaking vessel, and machine-assisted handwashing involves introducing water into the washing drum of a washing machine. Subsequently, the desired amount of detergent is dispensed. By manual stirring or running the washing machine, foam is produced. In the next step, the dirty laundry is immersed and left to soak for 10 to 30 min. In the case of handwashing, after this period, the laundry is washed manually to remove soiling. In the case of washing machines, the wash cycle is started (duration: about 60 minutes). Significant foaming during the wash cycle is interpreted as good cleaning action of the detergent.

In the course of rinsing, the excess wash liquor is poured away and the textiles are wrung out to remove the excess wash liquor absorbed. The rinse cycles consist of addition of fresh water, rinsing of the textiles to remove detergent residues, pouring the rinse liquor away and wringing of the textiles to remove the rinse liquor absorbed. In general, these rinse cycles are repeated until no further foam is visible (4 to 5 times). The formation of foam during the rinse cycle is associated with the presence of detergent, which is undesired.

In order to reduce water consumption and protect the environment, it would therefore be desirable to have an anti-foaming agent which barely affects foaming in the wash cycle, if at all, and gives lasting suppression of new foam in the rinse cycle. This could reduce the number of rinse cycles and hence the amount of water consumed.

U.S. Pat. No. 4,637,890 describes a granular detergent composition which results in reduced foaming and reduced turbidity of rinse water during the rinse cycle which follows a wash cycle, the composition comprising a surfactant, a water-soluble detergency builder, foam control prills comprising a silicone oil as a foam suppressant, and additionally fatty acid soaps and a quaternary ammonium salt.

The anti-foaming agent in this case only becomes active at low pH; in the wash cycle at pH values of >9 it is inactive. In the case of handwashing or machine-assisted handwashing, and in the case of machine washing, these high pH values are typically not attained in non-industrial use, and so the defoaming action sets in prematurely in the wash cycle.

U.S. Pat. No. 4,894,117 describes a composition of an agglomerated granular material for the delayed release of an anti-foaming agent in a wash liquor. These antifoam granules exhibit delayed release by virtue of the silicone anti-foaming agent being encapsulated by cellulose.

EP 254 499 B1 discloses a silicone defoaming composition which is obtained by reaction of a mixture of a trimethylsilyl-terminated polydimethylsiloxane and a silanol-terminated polydimethylsiloxane with a polyoxyethylene-polyoxypropylene copolymer and with silica. Use as an anti-foaming agent in detergent compositions is not described.

The technology utilized in the two documents mentioned above is the encapsulation of silicones or silicone defoamers, these substance classes having strong anti-foaming action. The activity of the retarded anti-foaming action in the rinse cycle depends on the release of these active ingredients, which in turn depends on many parameters, for example the temperature of the liquor and the duration of the individual steps. Therefore, the use of these systems is possible exclusively in the case of machine washing, where reproducible conditions exist with regard to temperature and duration. In the case of handwashing or in the case of machine-assisted handwashing, these systems cannot be used because of different washing practices. On the other hand, a product having retarded anti-foaming action or foam suppression irrespective of external parameters in the rinse cycle in the case of handwashing or in the case of machine-assisted handwashing is also effective in the case of machine washing.

WO 2011/107361 A1 and WO 2011/107397 A1 describe, as an anti-foaming agent, a polyether-containing aminosiloxane or a powder comprising a polyether-containing aminosiloxane on a carrier substance, and also the production process for and the use of this anti-foaming agent in detergent compositions for handwashing and machine washing, the anti-foaming agent not displaying its anti-foaming action until during the rinse cycle. The aminosiloxane which forms the basis of the anti-foaming agent contains a terminal polyether fragment. The active ingredients used are thus polyether-containing aminosiloxanes which do not display delayed anti-foaming action or foam suppression until the rinse cycle, and which are difficult to prepare. Such materials are produced in practice by equilibration reactions proceeding from OH-terminated polydimethylsiloxanes, $\alpha,\omega$-polyether-functional siloxanes and hydrolysates of the corresponding aminoalkylsilanes. A disadvantage is that the synthesis thereof often results in biphasic reaction mixtures, since the polyethersiloxane is incompatible with the rest of the components because of different polarities.

EP 685 250 A1 discloses the use of a mixture of an aminosiloxane and a finely divided silica in detergents for prevention of foaming during the rinse cycle.

A disadvantage of these mixtures is that the defoaming action sets in prematurely in the wash cycle and is not delayed until the rinse cycle. In the case of handwashing or in the case of machine-assisted handwashing, significant foaming is desirable in the wash cycle and is interpreted as a sign of good cleaning action of the detergent and hence of cleanliness.

SUMMARY OF THE INVENTION

The problem addressed was to provide an anti-foaming agent in substance or as a powder on a carrier material, which is usable with preference in detergent formulations for textiles, with no effect on the foaming characteristics of the detergent in the wash cycle and only delayed occurrence of good defoaming action in the rinse cycles.

DETAILED DESCRIPTION OF THE PREFERRED EMBODIMENTS

The invention provides antifoam powders with retarded anti-foaming action, comprising
(1) 5 to 35% by weight of an anti-foaming agent which is an amino-functional organopolysiloxane and consists of at least one siloxane unit of the general formula

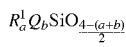 (I)

and siloxane units of the general formula

 (II)

where
R¹ is the same or different and is a hydrogen atom, a monovalent, optionally fluorine-, chlorine- or bromine-substituted $C_1$- to $C_{18}$-hydrocarbyl radical or a $C_1$- to $C_{12}$-alkoxy radical or a hydroxyl radical, preferably a $C_1$- to $C_{18}$-hydrocarbyl radical or a $C_1$- to $C_3$-alkoxy radical or a hydroxyl radical,
Q is an amino radical of the general formula

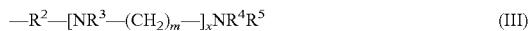 (III)

or forms thereof with partial or full protonation on the nitrogen atoms,
where
$R^2$ is a divalent $C_1$-$C_{18}$-hydrocarbyl radical, preferably a divalent $C_2$- to $C_4$-hydrocarbyl radical,
$R^3$ is a hydrogen atom or a $C_1$-$C_{10}$-alkyl radical,
$R^4$ is a hydrogen atom or a $C_1$-$C_{10}$-alkyl radical,
$R^5$ is a hydrogen atom or a $C_1$-$C_{10}$-alkyl radical,
a is 0, 1 or 2, preferably 0 or 1,
b is 1, 2 or 3, preferably 1,
c is 0, 1, 2 or 3, preferably 2 or 3,
m is 2, 3 or 4, preferably 2 or 3, and
x is 0, 1 or 2, preferably 0 or 1,
and the sum of a+b is less than or equal to 3,
(2) 65 to 95% by weight of a carrier material selected from the group of sodium carbonate, sodium sulphate, aluminium silicate, potassium carbonate, potassium sulphate, sodium hydrogencarbonate, potassium hydrogencarbonate and zeolites, and mixtures thereof.

Preferably, the inventive antifoam powder consists of aminosiloxane (1) and the abovementioned carrier material (2). Preferably, therefore, the additional use of silicas in the inventive anti-foaming powders is ruled out.

Examples of $C_1$- to $C_{18}$-hydrocarbyl radicals R¹ are alkyl radicals such as the methyl, ethyl, n-propyl, isopropyl, n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; cycloalkyl radicals such as the cyclopentyl, cyclohexyl, cycloheptyl and methylcyclohexyl radicals; aryl radicals such as the phenyl and the naphthyl radicals; alkaryl radicals such as o-, m-, p-tolyl radicals, xylyl radicals and ethylphenyl radicals; and aralkyl radicals such as the benzyl radical and the alpha- and beta-phenylethyl radicals.

Examples of fluorine-, chlorine- or bromine-substituted R¹ radicals are haloalkyl radicals such as the 3,3,3-trifluoro-n-propyl radical, the 2,2,2,2',2',2'-hexafluoroisopropyl radical, the heptafluoroisopropyl radical and the o-, m- and p-chlorophenyl radicals.

The alkoxy radicals R¹ are above-described alkyl radicals bonded via an oxygen atom, and examples of these alkyl radicals also apply in full to the alkoxy radicals.

Examples of divalent $C_1$- to $C_{18}$-hydrocarbyl radicals $R^2$ are saturated straight- or branched-chain or cyclic alkylene radicals such as the methylene and ethylene radicals, and also the propylene, butylene, pentylene, hexylene, 2-methylpropylene, cyclohexylene and octadecylene radicals, or unsaturated alkylene or arylene radicals such as the hexenylene radical and phenylene radicals, particular preference being given to the n-propylene radical and the 2-methylpropylene radical.

Examples of $C_1$- to $C_{10}$-alkyl radicals $R^3$, $R^4$ and $R^5$ are the examples given above for R¹ of linear and cyclic alkyl radicals and of $C_1$- to $C_{10}$-alkyl radicals substituted by fluorine, chlorine or bromine atoms.

Preferred amino radicals Q are those of the formula $NH_2CH_2CH_2NH(CH_2)_3-$, $NH_2(CH_2)_3-$, $CH_3NHCH_2CH_2NH(CH_2)_3-$, $(CH_3)_2NCH_2CH_2NH(CH_2)_3-$, $(CH_3)_2NCH_2CH_2CH_2NH(CH_2)_3-$, $CH_3CH_2HN(CH_2)_2NH(CH_2)_3-$, $(CH_3CH_2)_2N(CH_2)_2NH(CH_2)_3-$, $CH_3CH_2CH_2HN(CH_2)_2NH(CH_2)_3-$, $(CH_3CH_2CH_2)_2N(CH_2)_2NH(CH_2)_3-$ and (cyclohexyl)$HN(CH_2)_2NHCH_2CH(CH_3)CH_2-$, $NH_2CH_2CH_2NH(CH_2)_3-$ being a preferred example,
or forms thereof with partial or full protonation on the nitrogen atoms.

Preferred anti-foaming agents are the amino-functional organopolysiloxanes which, as well as units of the general formula I, also have units of the general formula II.

Preferred amino-functional organopolysiloxanes are linear polydimethylsiloxanes having siloxane units of the general formula I and optionally $C_1$- to $C_3$-alkoxy or hydroxyl end groups.

Particularly preferred anti-foaming agents are therefore amino-functional organopolysiloxanes of the general formula

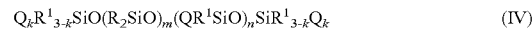 (IV)

where
R is the same or different and is a monovalent $C_1$- to $C_{18}$-hydrocarbyl radical,
R¹ is as defined above,
Q is as defined above,
k is 0 or 1,
m is 0 or an integer from 1 to 1000,
n is 0 or an integer from 1 to 50,
with the proviso that the organopolysiloxanes contain at least one Q radical per molecule.

Examples of amino-functional organopolysiloxanes of the formula (IV) are amino-functional polydimethylsiloxanes terminated by trimethylsiloxane units and amino-functional polydimethylsiloxanes terminated by hydroxydimethylsiloxane units and $C_1$-$C_3$-alkoxydimethylsiloxane units.

Preferably, the ratio of the siloxane units of the general formula (I) to the siloxane units of the general formula (II) is 1:1 to 1:10 000, preferably 1:2 to 1:300. The amine contents are preferably 0.5 to 6 meq/g, preferably 1.0 to 5 meq/g, measured as the consumption of 1 N hydrochloric acid in ml/g of amino-functional organopolysiloxane in the course of titration to the neutral point.

The amino-functional organopolysiloxanes preferably have an average viscosity of 25 to 10,000 mPa·s, more preferably 50 to 5,000 mPa·s, at 25° C.

The anti-foaming agent used may be one kind of amino-functional organopolysiloxanes (1) or various kinds of amino-functional organopolysiloxanes (1).

The amino radicals Q in formula (I) and formula (IV) may be partly or fully protonated. The amino radical Q of the formula (III) may be partly or fully protonated by addition of acids to the amino-functional organopolysiloxanes, giving the salt forms of the amino radicals.

Examples of acids are carboxylic acids having 3 to 18 carbon atoms, which may be linear or branched, such as formic acid, acetic acid, propionic acid, butanoic acid, pivalic acid, sorbic acid, benzoic acid and salicylic acid.

It is possible with preference to use protonated amino radicals Q' of the general formula $$—R^2—[NR^3—(CH_2)_m—]_xNH^+R^4R^5Z^- \quad (Va)$$

or $$—R^2—[NH^+R^3—(CH_2)_m—]_xNH^+R^4R^5(x+1)Z^- \quad (Vb)$$

where $Z^-$ is an anion to $N^+$, preferably an anion of a corresponding acid, preferably an anion of a carboxylic acid, such as an acetate anion, and $R^2$, $R^3$, $R^4$, $R^5$, m and x are each as defined above.

$NH_2CH_2CH_2NH(CH_2)_3$— is a preferred amino radical Q, and $N^+H_3CH_2CH_2NH(CH_2)_3^-Z^-$ or $N^+H_3CH_2CH_2N^+H_2(CH_2)_3$-$2Z^-$ (where $Z^-$ is as defined above) are therefore preferred protonated amino radicals Q'.

The inventive anti-foam powders are preferably produced by mixing the amino-functional organopolysiloxanes (1) with the carrier materials (2).

Preferably, the carrier material (2) is initially charged and then the aminosiloxane (1) is added and mixed with (2). The mixing can be effected at temperatures of 20 to 120° C. and at the pressure of the surrounding atmosphere, i.e. at about 1020 hPa, or else at higher or lower pressures.

The inventive anti-foaming agents or powders thereof have the advantage that they do not affect the foaming characteristics of the detergent in the wash cycle and only delayed occurrence of good defoaming action occurs in the rinse cycles.

The inventive anti-foaming agents or powders thereof additionally have the advantage of saving large amounts of water through avoidance of unnecessary rinse cycles, and can be used for different fields of use, for example personal care, haircare, homecare and the like.

The invention therefore provides detergent compositions comprising
(A) inventive anti-foaming agents or powders thereof and
(B) customary detergent components.

The inventive anti-foaming agents or powders thereof are used in the detergent compositions in amounts of preferably 0.5 to 5% by weight, based on the detergent composition.

Preferably, the detergent compositions are used for handwashing or machine-assisted handwashing. However, they can also be used for machine washing.

Examples of customary detergent components (B) for handwashing or machine washing are surfactants, preferably anionic and non-ionic surfactants, builders, bleaches, enzymes, chelate-forming compounds and perfumes, as described, for example, in Handbook of Detergents, Part D, Chapt. 3, p. 51 ff.: Randall A. Watson "Laundry Detergent Formulations".

EXAMPLES

1. Synthesis of the Inventive Amine Oils and of the Non-Inventive Amine Oil Dispersion Example 1

Synthesis of the Methyl-Terminated Amine Oil 1

60.2 g of an OH-terminated polydimethylsiloxane having a viscosity of 80 mm²/s (25° C.), 22.4 g of an OH-terminated hydrolysate of aminoethylaminopropylmethyldimethoxysilane with a viscosity of 2460 mm²/s (25° C.) and 30.6 g of a methyl-terminated polydimethylsiloxane having a viscosity of 20 mm²/s (25° C.) are initially charged in a three-neck flask with stirrer and water separator and heated to 120° C. At this temperature, 103 mg of a 20% solution of KOH in methanol are metered in and the resulting reaction mixture is stirred at 120° C. and a pressure of 70 mbar for 2 h. The water formed is removed in the water separator. Subsequently, the vacuum is broken, the reaction mixture is cooled to 80° C., 33.1 mg of acetic acid are metered in for neutralization and the resulting reaction mixture is stirred for 30 min. Thereafter, the mixture is cooled to room temperature, filtered and devolatilized on a rotary evaporator at 150° C./1 mbar for 1 h. This gives a clear oil having a viscosity of 180 mm²/s (25° C.) and an amine density of 2.8 meq/g.

Example 2

Synthesis of the Methyl-Terminated Amine Oil 2

Amine oil 2 is prepared in analogy to amine oil 1 with the following stoichiometry:
65.4 g of an OH-terminated polydimethylsiloxane having a viscosity of 80 mm²/s (25° C.)
17.0 g of an OH-terminated hydrolysate of aminoethylaminopropylmethyldimethoxysilane with a viscosity of 2460 mm²/s (25° C.)
30.6 g of a methyl-terminated polydimethylsiloxane having a viscosity of 20 mm²/s (25° C.)

This gives a clear oil having a viscosity of 185 mm²/s (25° C.) and an amine density of 2.2 meq/g.

Example 3

Synthesis of the Methyl-Terminated Amine Oil 3

Amine oil 3 is prepared in analogy to amine oil 1 with the following stoichiometry:
67.4 g of an OH-terminated polydimethylsiloxane having a viscosity of 80 mm²/s (25° C.)
15.0 g of an OH-terminated hydrolysate of aminoethylaminopropylmethyldimethoxysilane with a viscosity of 2460 mm²/s (25° C.)
30.6 g of a methyl-terminated polydimethylsiloxane having a viscosity of 20 mm²/s (25° C.)

This gives a clear oil having a viscosity of 169 mm²/s (25° C.) and an amine density of 1.8 meq/g.

Example 4

Synthesis of the Reactive-Terminated Amine Oil 4

79.0 g of an OH-terminated polydimethylsiloxane having a viscosity of 80 mm²/s (25° C.) and 21.0 g of aminoethylaminopropylmethyldimethoxysilane are initially charged in a three-neck flask with stirrer and water separator, and heated to 120° C. At this temperature, 200 mg of a 20% solution of KOH in methanol are metered in and the resulting reaction mixture is stirred at 120° C. and a pressure of 700 mbar for 2 h. The water/methanol mixture formed is removed in the water separator. Subsequently, the vacuum is broken, the reaction mixture is cooled to 80° C., 33.1 mg of acetic acid are metered in for neutralization and the resulting reaction mixture is stirred for 30 min. Thereafter, the mixture is cooled to room temperature, filtered and devolatilized on a rotary evaporator at 150° C./1 mbar for 1 h. This gives a clear oil having a viscosity of 106 mm²/s (25° C.) and an amine density of 2.7 meq/g.

Example 5

Synthesis of the Reactive-Terminated Amine Oil 5

950.0 g of an OH-terminated polydimethylsiloxane having a viscosity of 80 mm²/s (25° C.), 317.0 g of aminoethylaminopropyltrimethoxysilane and 1.2 g of a 30% solution of sodium methoxide in methanol are initially charged in a three-neck flask with stirrer and reflux condenser and stirred at reflux for 3 h. Subsequently, the reaction mixture is cooled to 50° C., and 2.4 g of 20% hydrochloric acid are added. Thereafter, the mixture is cooled further to room temperature, filtered and devolatilized on a rotary evaporator at 150° C./1 mbar for 1 h. This gives a clear oil having a viscosity of 25 mm²/s (25° C.) and an amine density of 2.5 meq/g.

Comparative Example

Preparation of a Dispersion of Amine Oil 1 and Finely Divided Silica, Non-Inventive 99.0 g of the amine oil 1 are admixed with 1.0 g of finely divided silica of the SKS 300 type (available from Wacker Chemie AG) and then stirred with a Turrax® mixer at room temperature for 10 min. The resulting suspension is used directly for the production of the antifoam powder.

2. Production of the Inventive Antifoam Powder and of the Non-Inventive Antifoam Powder A beaker is initially charged with 90 g of sodium carbonate powder (manufacturer: Sigma-Aldrich, article number 330361, particle size: <100 µm: 3.25%, 100-200 µm: 26.00%, 200-315 µm: 46.29%, 315-500 µm: 23.74%, 500-1000 µm: 0.67%, 1000-2000 µm: 0.05%, >2000 µm: 0%;) and stirred with a paddle stirrer at 750 rpm. Subsequently, within 2 min, a pipette was used to homogeneously add 10 g of the above-described amine oils 1 to 5 or the amine oil dispersion according to the Comparative Example to the sodium carbonate powder. On completion of metered addition, the mixture is stirred for another 1 min.

3. Performance Tests for Handwashing

The handwash tests were conducted analogously to the following protocol:

A bowl is charged with 5.0 l of demineralized water for the wash cycle.

17.5 g of Tide® powder detergent, Prod. No. 99353576 (manufacturer: Procter & Gamble, China) are mixed in a beaker with 1.05 g of antifoam powder (as produced above in point 2) and added to the bowl.

The resulting liquor is agitated gently for 2 min, such that the detergent formulation dissolves.

A prewashed and dry terry cloth towel (100% cotton, size about 45×90 cm; basis weight about 500 g/m²) is cut into four parts and weighed.

One piece of terry cloth is immersed into each liquor and wrung out ten times.

30 seconds after the last dipping or wringing operation, the wash liquor is photographed from above and the foam-covered surface area in per cent is estimated.

All four terry cloth pieces are wrung out to an increase in weight of 390 g (+/−0.5 g).

For the rinse cycle, a further bowl is charged with 5.0 l of demineralized water.

All four terry cloth pieces are placed into the bowl and each is immersed and wrung out three times.

All four terry cloth pieces are brought to an increase in weight of 450 g.

After 30 seconds, a photo is taken of the rinse liquor and the foam-covered surface area in per cent is estimated.

A total of 5 rinse cycles, each with fresh water, are done.

The results are summarized in Table 1.

TABLE

Foam in the wash cycle and the rinse cycles in the case of handwashing

| Antifoam powder Examples/ Comparative Example | Foam Wash cycle [%] | Foam Rinse cycle 1 [%] | Foam Rinse cycle 2 [%] | Foam Rinse cycle 3 [%] | Foam Rinse cycle 4 [%] | Foam Rinse cycle 5 [%] |
|---|---|---|---|---|---|---|
| Blank value | 100 | 100 | 95 | 70 | 20 | 10 |
| Example 1 | 75 | 95 | 5 | 0 | 0 | 0 |
| Example 2 | 80 | 95 | 5 | 0 | 0 | 0 |
| Example 3 | 95 | 95 | 5 | 5 | 5 | 0 |
| Example 4 | 75 | 95 | 0 | 0 | 0 | 0 |
| Example 5 | 70 | 95 | 40 | 30 | 20 | 10 |
| Comparative Example | 40 | 80 | 10 | 5 | 0 | 0 |

In the examples reported in the table, antifoam powders were produced by the procedure described in point 2 using the amine oils described in Examples 1 to 5 or amine oil dispersion described in the Comparative Example. The concentration of the amine oil on the sodium carbonate carrier material was 10% in all cases.

The Inventive Examples show good defoaming action in the rinse cycle, with barely any effect on foaming in the wash cycle (95-70%).

The Comparative Example compared with the Inventive Examples shows a significant impairment of foaming (40%) in the wash cycle, which is undesired.

4. Performance Tests for Machine Washing

The machine wash tests were conducted analogously to the following protocol:

A Miele Novotronic W 918 domestic washing machine was charged with 3.5 kg of clean cotton laundry.

130 g of the test detergent ECE-2 (source: wfk Testgewebe GmbH, D-41379 Brüggen-Bracht, article number 88031, defoamer-free) is mixed with 0.65 g of SIL-FOAM® SC 124 anti-foaming agent (available from Wacker Chemie AG) in a beaker (comparative test). In the Inventive Example, an additional 0.65 g of amine oil 1 (corresponding to 6.5 g of a 10% powder on soda; for production see point 2) is added.

The test detergent is introduced directly into the washing machine drum.

Washing machine is started at 40° C. or 95° C. with boil/coloured wash programme and a water hardness of 3° dH; the spin speed is 1600 rpm.

The visible area of the porthole is provided with a vertical scale. The scale goes from 0% (no foam) to 100% (porthole completely full of foam).

The foam height is recorded visually over all of the rinse cycles in steps of 1 min.

The mean is calculated from all the individual values from the foam height recording.

Assessment of Defoaming in the Rinse Cycle, Mean Over all Rinse Cycles:

Wash Temperature 40° C.:

Comparative Test (Machine, Non-Inventive):

with 0.5% SILFOAM® SC 124:36%

Example (machine, inventive):

with 0.5% SILFOAM® SC 124+0.5% amine oil 1 32% (amine oil 1 as 10% powder on soda carrier, see point 2)

Wash Temperature 95° C.:
Comparative Test (Machine, Non-Inventive):
with 0.5% SILFOAM® SC 124:68%
Example (machine, inventive):
with 0.5% SILFOAM® SC 124+0.5% amine oil 1 37% (amine oil 1 as 10% powder on soda carrier, see point 2)

By addition of the inventive antifoam powder comprising the inventive amine oil, good defoaming action is achieved in the rinse cycle, whereas, in the comparative test without the inventive antifoam powder but with addition of a commercial anti-foaming agent, the defoaming action in the rinse cycle is much poorer, particularly at high wash temperatures.

The invention claimed is:

1. An anti-suds powder with delayed anti-sudsing action, comprising
   (1) 5 to 35% by weight of an anti-sudsing agent which is an amino-functional organopolysiloxane and consists of at least one siloxane unit of the formula $$R^1_a Q_b SiO_{\frac{4-(a+b)}{2}} \qquad (I)$$

and siloxane units of the general formula $$R^1_c SiO_{\frac{4-c}{2}} \qquad (II)$$

where
   $R^1$ is the same or different and is a hydrogen atom, a monovalent, optionally fluorine-, chlorine- or bromine-substituted $C_1$- to $C_{18}$-hydrocarbyl radical or a $C_1$- to $C_{12}$-alkoxy radical or a hydroxyl radical,
   Q is an amino group of the formula $$-R^2-[NR^3-(CH_2)_m-]_x NR^4 R^5 \qquad (III)$$

or partially or fully protonated forms thereof, and mixtures thereof
   where
   $R^2$ is a divalent $C_1$-$C_{18}$-hydrocarbyl radical,
   $R^3$ is a hydrogen atom or a $C_1$-$C_{10}$-alkyl radical,
   $R^4$ is a hydrogen atom or a $C_1$-$C_{10}$-alkyl radical,
   $R^5$ is a hydrogen atom or a $C_1$-$C_{10}$-alkyl radical,
   a is 0, 1 or 2,
   b is 1, 2 or 3,
   c is 0, 1, 2 or 3,
   m is 2, 3 or 4, and
   x is 0, 1 or 2,
   and the sum of a+b is less than or equal to 3,
   (2) 65 to 95% by weight of a sodium carbonate, sodium sulphate, aluminium silicate, potassium carbonate, potassium sulphate, sodium hydrogencarbonate, potassium hydrogencarbonate, or zeolite carrier material, with the proviso that the anti-suds powder is free of silicas.

2. The anti-suds powder of claim 1, wherein at least one amino-functional organopolysiloxanes (1) has the formula $$Q_k R^1_{3-k} SiO(R_2 SiO)_m (QR^1 SiO)_n SiR^1_{3-k} Q_k \qquad (IV)$$

where
R is the same or different and is a monovalent $C_1$- to $C_{18}$-hydrocarbyl radical,
k is 0 or 1,
m is 0 or an integer from 1 to 1000,
n is 0 or an integer from 1 to 50,
with the proviso that the organopolysiloxanes contain at least one Q radical per molecule.

3. The anti-suds powder of claim 1, wherein Q is a radical of the formula $NH_2CH_2CH_2NH(CH_2)_3-$ or partially or fully protonated forms thereof $N^+H_3CH_2CH_2NH(CH_2)_3-Z^-$ or $N^+H_3CH_2CH_2N^+H_2(CH_2)_3-2Z^-$, where $Z^-$ is an anion to $N^+$.

4. The anti-suds powder of claim 3, wherein $Z^-$ is an anion of a carboxylic acid.

5. The anti-suds powder of claim 3, wherein $Z^-$ is an anion of acetic acid.

6. The anti-suds powder of claim 2, wherein Q is a radical of the formula $NH_2CH_2CH_2NH(CH_2)_3-$ or partially or fully protonated forms thereof $N^+H_3CH_2CH_2NH(CH_2)_3-Z^-$ or $N^+H_3CH_2CH_2N^+H_2(CH_2)_3-2Z^-$, where $Z^-$ is an anion to $N^+$.

7. The anti-suds powder of claim 1, wherein $R^1$ is a $C_1$- to $C_{18}$-hydrocarbyl radical, a $C_1$- to $C_3$-alkoxy radical, or a hydroxyl radical.

8. The anti-suds powder of claim 2, wherein $R^1$ is a $C_1$- to $C_{18}$-hydrocarbyl radical, a $C_1$- to $C_3$-alkoxy radical, or a hydroxyl radical.

9. A process for producing an anti-suds powder of claim 1, comprising mixing the amino-functional organopolysiloxane (1) with the carrier material (2).

10. A process for producing an anti-suds powder of claim 2, comprising mixing the amino-functional organopolysiloxane (1) with the carrier material (2).

11. A process for producing an anti-suds powder of claim 3, comprising mixing the amino-functional organopolysiloxane (1) with the carrier material (2).

12. A process for producing an anti-suds powder of claim 6, comprising mixing the amino-functional organopolysiloxane (1) with the carrier material (2).

13. A detergent composition comprising
    (A) at least one anti-sudsing agent (1) of claim 1 or an anti-suds powder comprising anti-sudsing agent (1) and carrier material (2), and
    (B) customary detergent components.

14. A detergent composition comprising
    (A) at least one anti-sudsing agent (1) of claim 2 or an anti-suds powder comprising anti-sudsing agent (1) and carrier material (2), and
    (B) customary detergent components.

* * * * *